United States Patent [19]

Kistner et al.

[11] 4,141,044
[45] Feb. 20, 1979

[54] MAGNETICALLY ENCODED CARD READ/WRITE/CAPTURE APPARATUS

[75] Inventors: Jerome L. Kistner; Thomas R. Aultz, both of Cincinnati; Billy G. Roy; Willis C. Haight, both of Milford, all of Ohio

[73] Assignee: The Mosler Safe Company, Hamilton, Ohio

[21] Appl. No.: 724,697

[22] Filed: Sep. 17, 1976

[51] Int. Cl.² .................. G06K 7/04; G06K 7/08; G11B 25/04
[52] U.S. Cl. .............................. 360/2; 235/475; 235/478
[58] Field of Search .............. 235/61.11 D, 479, 480, 235/475, 485, 486; 360/88, 2

[56] References Cited

U.S. PATENT DOCUMENTS

| | | | |
|---|---|---|---|
| 3,160,739 | 12/1964 | Anderegg | 235/479 |
| 3,627,994 | 12/1971 | Sellech et al. | 235/479 |
| 3,692,981 | 9/1972 | Poylo et al. | 235/61.11 D |
| 3,885,132 | 5/1975 | Luoma | 235/480 |
| 3,999,023 | 12/1976 | Sedley | 235/61.11 D |

*Primary Examiner*—Vincent P. Canney
*Attorney, Agent, or Firm*—Wood, Herron & Evans

[57] ABSTRACT

Apparatus for capturing a card and/or reading and/or writing data bits on a record stripe of the card, including a carriage for supporting a card inserted into the apparatus via a slot, the carriage being bidirectionally selectively driven past a transducer on elongated guide means by a motorized rotatable screw threadably engaging the carriage. A card clamp assembly is associated with the carriage for clamping an inserted card thereto when the carriage is located in other than its home position, whereat positive transfer of a card between the insertion slot and carriage occurs, which home position is proximate the card insertion slot. Stationarily mounted cams cooperating with cam followers of the card clamp assembly deactivate the clamp when the carriage is in its home position to facilitate transfer of an inserted card to and from the carriage. A motor-driven pick-up roll assembly located between the card insertion slot and the carriage home position facilitates mounted positive transfer of a card between the slot and carriage. A card abutment selectively interposable in the path of a card carried by the translating carriage strips and the card from the carriage for deposit in an underlying bin to capture an inserted card rather than return it to the user. A slotted disc mounted for rotation with the carriage drive screw cooperates with a phototransducer assembly to provide timing pulses at a rate correlated to the rate a card carried by the carriage moves past the transducer, enabling data to be read from and/or written on the card record stripe at a density, in bits per unit record length, which is invariant notwithstanding variations in the translational velocity of the card past the transducer. A mounting assembly for the transducer is provided which accommodates for variations in the position of the card record stripe relative to the transducer induced by vibration, card warpage and the like.

8 Claims, 9 Drawing Figures

MAGNETICALLY ENCODED CARD READ/WRITE/CAPTURE APPARATUS

This invention relates to apparatus for reading, writing and/or capturing cards bearing a record strip having magnetically encoded information thereon.

It has been proposed in the past to provide apparatus for reading and/or writing and/or capturing data-bearing cards, such as plastic credit cards having a magnetic stripe on one face. Design criteria for such apparatus are reliability, low cost, minimal maintenance, and structural and operational simplicity. These characteristics are particularly desirable with card apparatus designed to be utilized with card-operated automatic cash dispensers which are, at increasingly frequent rates, located at remote, geographically scattered points, such as suburban shopping centers, supermarkets and the like. Under such circumstances the card apparatus must function 24 hours a day, seven days a week; hence, reliability is an important factor. In addition, the travel time involved in servicing a large number of geographically scattered card devices becomes a significant factor. Accordingly, low maintenance becomes increasingly more important. Structural and operational simplicity, which typically is an index of low initial cost and service-free maintenances, is desirable for obvious reasons.

It has been an objective of this invention to provide card reading/writing apparatus having the foregoing characteristics. This objective has been accomplished, in accordance with certain principles of the invention, by providing a card device having a stationarily mounted transducer past which a carriage carrying the record stripe-bearing card translates between a home position proximate a card insertion slot and a position remote therefrom. The carriage includes a card support surface having suitably disposed card locating shoulders against which the card is clamped by a pair of pivotally mounted card engaging members which are normally biased against the card by springs. The card clamps each have a cam follower which, when the carriage is in its home position, engages a stationary cam to pivot the clamps out of engagement with the card, thereby facilitating convenient transfer of a card to and from the carriage via the insertion slot. The cam followers disengage their respectively associated stationary cams as the carriage leaves the home position to facilitate clamping of an inserted card in the carriage. Clamping of the card flattens it to correct any warpage in the card which may exist. Thus, an inserted card is positively clamped, flattened and located on the carriage as the latter translates past the transducer, improving the reliability of the card reading/writing operation.

In accordance with a further aspect of the invention, which is designed to facilitate data reading and/or writing on the card record stripe at a constant data bit density per unit length of record stripe notwithstanding variations in the relative velocity between the moving card and transducer, a screw which threadably engages the carriage is provided to bidirectionally translate the carriage when a bidirectional motor connected thereto is energized. The drive screw has mounted to it for rotation therewith an indicia-bearing disc which cooperates with a stationary transducer for generating timing signals at a rate correlated to the rotational rate of the screw, and hence of the translational rate relative to the transducer of the carriage and the card clamped thereto. Generation of timing signals at a rate correlated to card velocity provides timing slots, or windows, for reading and/or writing data bits on the card at a rate which varies with the relative translational movement velocity of the card and transducer. As a consequence, the density of recording and/or reading data bits from the moving card record stripe is maintained at a predetermined constant rate notwithstanding variations in the speed at which the card is moved past the transducer.

In accordance with a further aspect of the invention a movable card abutment, which is selectively interposable in the path of a moving card clamped in the moving carriage, is provided for stripping the card from the carriage as the card is moved in a direction away from its home position to its other limit of travel. With the card abutment interposed in the card path, as the carriage is driven away from its home position the leading edge of the card strikes the interposed card abutment, causing the card to slide off the translating carriage into an underlying captured-card bin. Thus, a card capture capability is added to the card reader/writer apparatus of this invention with a minimum of additional hardware, the only additional hardware necessary being a detent and means, such as a solenoid, to selectively move the detent between its card capture and non-capture positions.

These and other advantages and objectives of the invention will become more readily apparent from a detailed description thereof taken in connection with the drawings in which.

Figure 9:
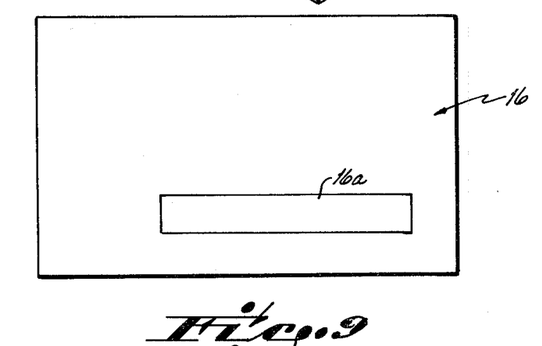
FIG. 9 is a plan view of a card showing the elongated magnetic record stripe.

The card read/write apparatus of this invention, in a preferred form, includes a frame 10 having spaced-apart parallel vertical side walls 11 and 12, a vertical rear wall 13 fastened at its opposite vertical side edges to the rear vertical edges of the side walls, and a front vertical wall 14 secured at its opposite vertical side edges to the front vertical edges of the side walls. A horizontal slot 15 is provided in the front wall 14 to facilitate insertion and removal into the read/write device of a rectangular card 16 bearing an elongated magnetic stripe 16a (FIG. 9). A pick-up roll assembly 17 mounted just inside the frame 10 proximate the card insertion/withdrawal slot 15 provided to positively feed the card into and out of the read/write device via slot 15 when the pick-up roll assembly is alternatively driven in in-feed and out-feed directions, as desired.

The apparatus of this invention further includes a card-supporting carriage assembly 20. The carriage assembly 20 is designed to receive and support a card inserted into the slot 15 which is in-fed by pick-up roll assembly 17, transport the card along a horizontal read/write path 22 past a relatively stationary magnetic transducer assembly 24 which includes a transducer 24a having a transducing surface 24b to facilitate reading and/or writing on card record stripe 16a and/or transport the card past a card capture assembly 36 which removes the card from the carriage assembly for storage in an underlying bin 38, and/or return the card to the pick-up roll assembly 17 for out-feed via slot 15. A mounting assembly for the transducer is provided which accommodates for variations in the position of the card record stripe relative to the transducer induced by vibration, card warpage and the like. Associated with the card-supporting carriage assembly 20 is a card clamp assembly 21 which clamps an inserted card in the carriage assembly when the carriage moves the card along the path 22.

Also associated with the carriage assembly 20 are a pair of spaced-apart parallel horizontally disposed guide rods 23. The guide rods 23, which are parallel to card path 22, are mounted at their opposite ends between the frame end wall 13 and a horizontally disposed brace 25 spanning the frame side walls 11 and 12 at a point behind the pick-up roll assembly 17. The guide rods 23 are slidably received in bores 26 and 27 formed in the carriage assembly 20. The carriage is constrained to move along a path such that a card carried thereby follows path 22. A carriage drive screw 28 journaled for rotation in frame walls 13 and 25 about a longitudinal axis parallel to guide rods 23 is threadably engaged with a nut 29 forming part of the carriage assembly 20 for reciprocating the carriage assembly, to in turn reciprocate a card supported by the carriage assembly along the path 22. To bidirectionally rotate the screw 28 and in turn reciprocate the carriage assembly 20, a motor 30 secured to the frame rear wall 13 and having its bidirectionally rotatable drive shaft 33 secured to the screw 28, is provided. To dampen vibrational displacement between the transducer assembly 24 and a card supported in the carriage assembly 20 moving along path 22, a vibration dampening assembly 32 forming part of the carriage assembly 20, is provided.

A slotted timing wheel 6 secured for rotation with the drive screw 28 cooperates with a stationary phototransducer assembly 7 to create timing pulses at a rate correlated to the rotational rate of the screw and hence the translational reciprocation rate of the carriage and a card clamped therein. The timing pulses establish timing slots, or windows, for reading and/or writing data bits on the card record stripe 16a moving along path 22 at a bit rate correlated to the translational velocity of the card. As a result, data bits are read and/or written on the card at a constant bit density per unit length of record stripe, irrespective of variations in card translational velocity past transducer assembly 24.

Finally, to selectively capture cards which have been inserted into the read/write device of this invention, a card capturing assembly 36 is included. The card capture assembly 36 includes a vertically shiftable card abutment 37 which, when selectively elevated to its upper position (shown in phantom lines in FIG. 2), is interposed in the path 22 of a card supported and moving with the carriage 20. Thus, when the carriage reciprocates rearwardly (rightwardly as viewed in FIG. 1), a card clamped in the carriage will be forced to slide off the carriage into a captured-card collection bin 38 lying underneath the carriage path at the forward section of the frame.

The pick-up roll assembly 17, more specifically, includes super-imposed lower and upper friction rolls 17a and 17b which are mounted for bidirectional rotation with shafts 40 and 41 journaled at their opposite ends in suitable bearings secured to the frame side walls 11 and 12. A bidirectional motor 43 having an output shaft 44 drives the lower feed roll 17a via meshing gears 45 and 46 secured to the shafts 44 and 40, respectively. Depending upon the state of energization of the motor 43, motor shaft 44 rotates in one or the other of its opposite directions, in turn driving feed roll 17a in either an in-feed or out-feed direction, as the case may be, to positively feed the card inserted into slot 15 into the read/write device of this invention or return a card to the user via the slot 15.

The carriage 20 preferably is in the form of a horizontally disposed plate or block 50 consisting of a relatively large and generally rectangular lower section 50a and a relatively small and generally C-shaped upper section 50b. The upper section 50b contains the bores 26 and 27 which slidably receive the guide rods 23 on which the carriage assembly 20 reciprocates horizontally when driven by the screw 28. The nut 29, which threadably engages the drive screw 28, is positioned in the cut-out portion of the upper plate section 50b and connects to the upper plate section 50b via a vibration dampening connecting plate 51 of vibration dampening assembly 32. The plate 51 at its forward end connects to the nut 29 with threaded fasteners 52, 52 which pass through rubber grommets 53, 53 located in suitable holes provided in the plate 51. The vibration dampening plate connector 51 at its rear end connects to the rear end of the upper carriage section 50b with fasteners 55, 55 which pass through rubber grommets 56, 56 provided in suitable holes in the rear of the plate 51. Thus, the drive connection between the nut 29 which threadably engages the drive screw 28 and the carriage block 50 which supports the card as it moves along path 22 past the transducer assembly 24, is made via a plate 51 which is isolated from the nut 29 and the block 50 with resilient rubber grommets 53, 53 and 56, 56.

The lower surface of the carriage plate 50a is provided with a rectangular recess defined by vertical spaced-apart parallel locating shoulders 57 and 58 which slidably engage the longitudinal side edges of an inserted card 16 and a rear vertical shoulder or card stop member 59 against which the leading end of the inserted card abuts. The card-receiving recess defined by shoulders 57, 58 and 59 is disposed in a horizontal plane in alignment with card slot 15 and parallel to card path 22.

Figures 3, 4, 5:
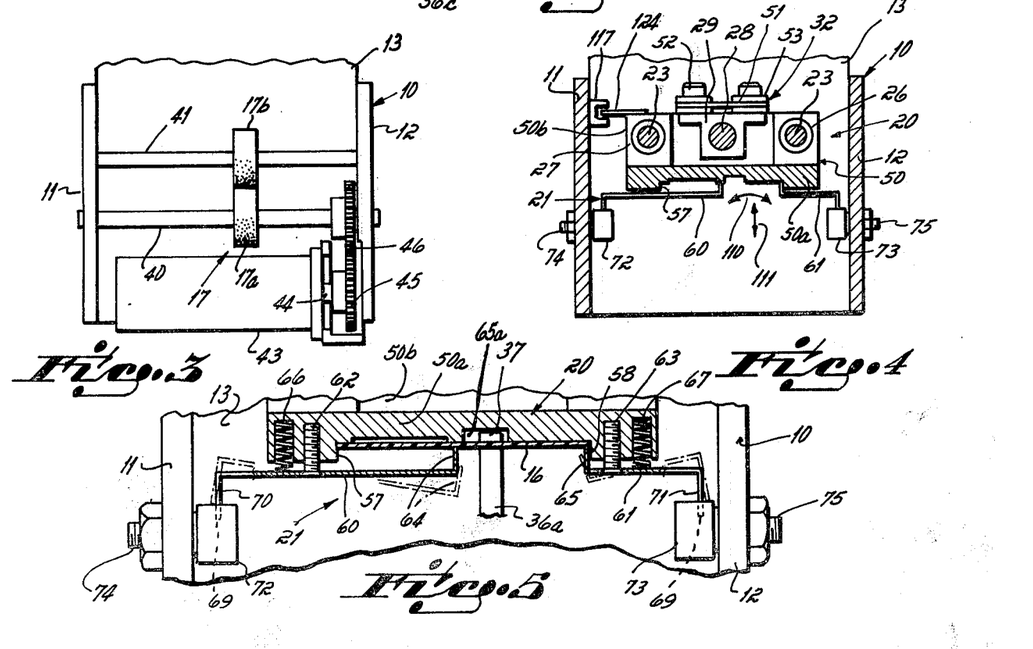
FIG. 3 is a cross-sectional view along line 3—3 of FIG. 2.
FIG. 4 is a cross-sectional view along line 4—4 of FIG. 2.
FIG. 5 is an enlarged vertical cross-sectional view of a portion of the apparatus shown in FIG. 4.
Figure 6:
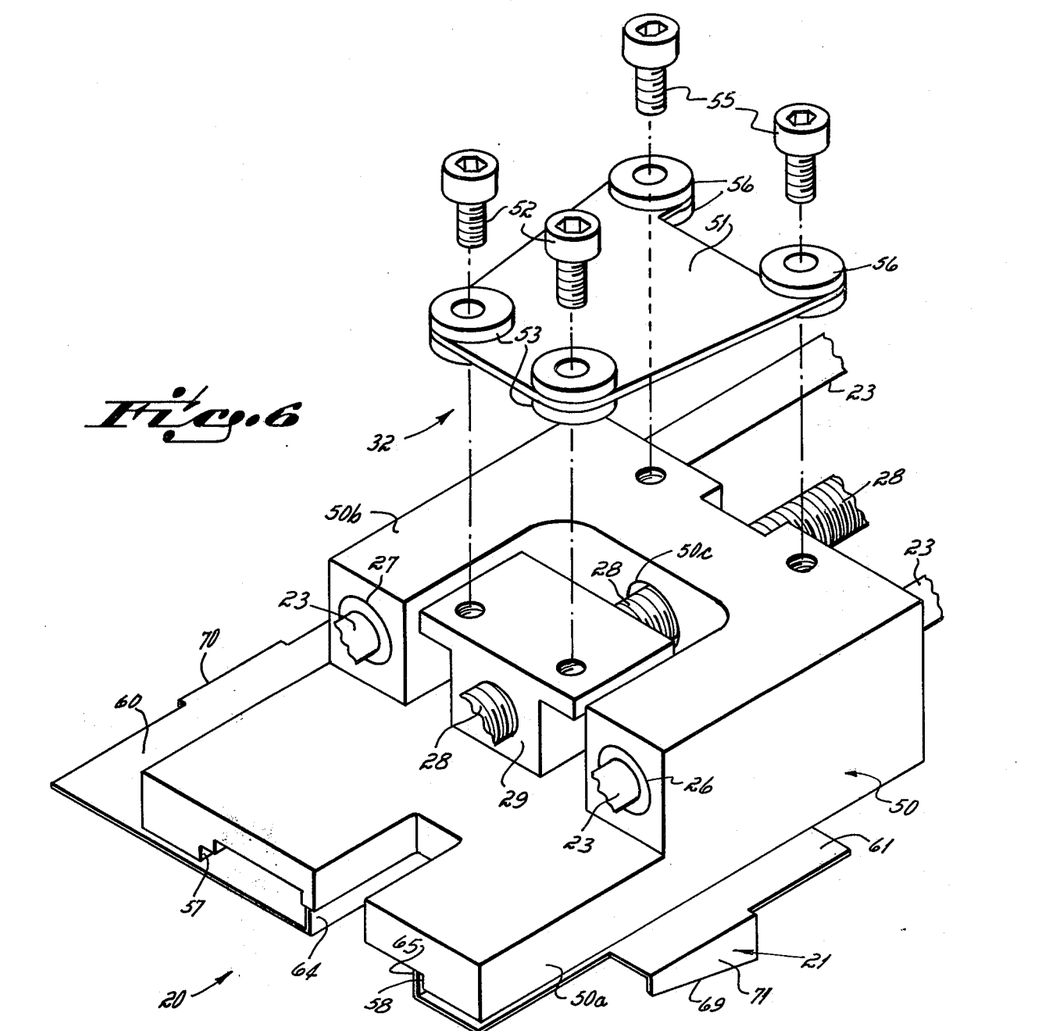
FIG. 6 is a perspective view, partially exploded, of the card carriage utilized in the apparatus of this invention.

The card clamp assembly 21 consists of a pair of generally rectangular plates 60 and 61. Plates 60 and 61 are mounted to the lower surface of the lower carriage block 50a by screw fasteners 62 and 63 for pivotal movement between an active, card-clamping position shown in solid lines and an inactive, card-unclamping position shown in phantom lines (FIG. 5).

In the active position upturned flanges 64 and 65 formed on the inner edges of the plates 60 and 61 engage the inserted card 16 on opposite sides of record stripe 17, urging it against the upper surface of the cavity formed in carriage block 50a defined by shoulders 57, 58 and 59. In the inactive position shown in phantom lines the flanges 64 and 65 of the clamp plate 60 and 61 are vertically spaced from the surface to facilitate insertion and removal of the card into the recess in the bottom of carriage block 50 defined by shoulders 57, 58 and 59.

Compression springs 66 and 67 act between the carriage block section 50a and the clamp plates 60 and 61 outboard of the screw fasteners 62 and 63 about which the plates pivot. The springs 66 and 67 normally bias the clamp plates 60 and 61 to their active position against the surface shown in solid lines.

Figure 1:
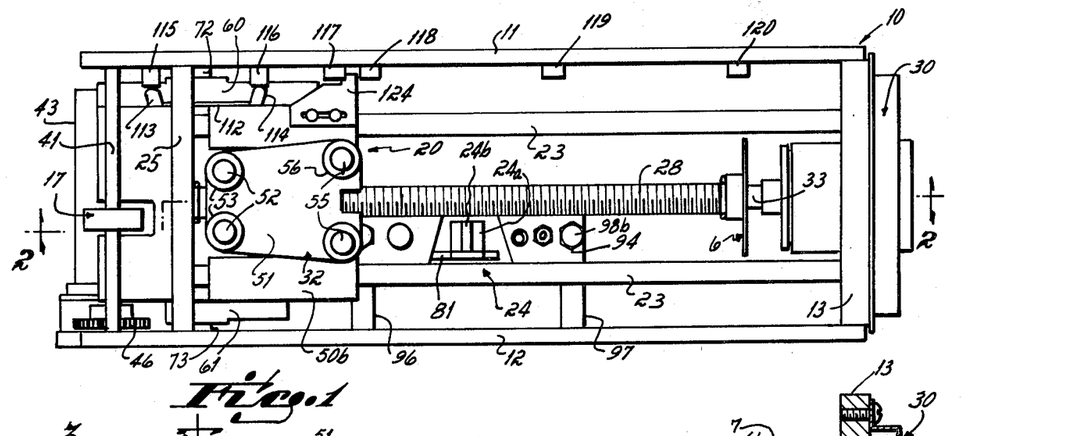
FIG. 1 is a top plan view of the card reading and/or writing and/or capturing apparatus of this invention.

To position the clamp plates 60 and 61 in their inactive position with flanges 64 and 65 spaced from that surface to facilitate insertion and removal of a card, the clamp plates 60 and 61 are provided with depending flanges 70 and 71 which function as cam followers, and stationary cam rolls 72 and 73 secured via suitable threaded fasteners 74 and 75 to the inner surfaces of the frame side walls 11 and 12. The cam followers 70 and 71 have downwardly and rearwardly inclined lower edges 69 as shown best in FIGS. 2 and 5. The cam rolls 72 and 73 are positioned such that when the carriage assembly 20 is at its forwardmost limit of travel, or home position (shown in FIGS. 1 and 2), the cam followers 70 and 71 have ridden up the cam rolls 72 and 73 pivoting the cam plates 60 and 61 to their inactive position shown in phantom lines. As the carriage assembly moves rearwardly (rightwardly as seen in FIGS. 1 and 2), the cam followers 70 and 71 descend under the force of compression springs 66 and 67 to move to the active position shown in solid lines in FIG. 5.

Figure 2:
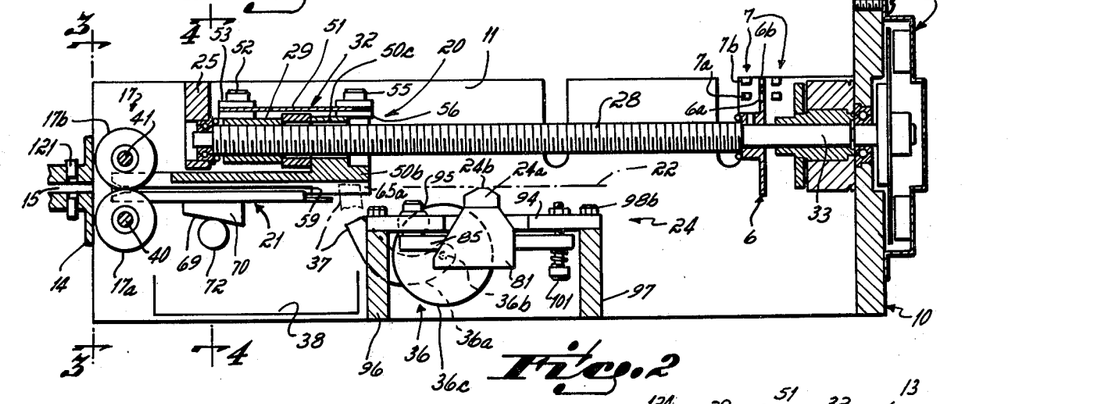
FIG. 2 is a cross-sectional view along line 2—2 of FIG. 1.

Thus, as the carriage assembly 20 moves to its left limit of travel shown in FIG. 2, the cam followers 70 and 71 cam upwardly on the stationary cam rolls 72 and 73 to pivot the cam plates 60 and 61 to their inactive, card-unclamping position shown in phantom lines. Similarly, as the carriage assembly 20 moves away from its forward (leftward as viewed in FIG. 2), limit of travel toward the rear (right as viewed in FIG. 2), the springs 66 and 67 return the clamp plates 60 and 61 to their normal, active, card-clamping position shown in solid lines. There is a transition period as the carriage assembly 20 moves a slight distance toward and away from its home position, or left limit of travel (as viewed in FIG. 2), when the card clamp plates 60 and 61 are moving between their inactive and active position, respectively, but have fully reached neither.

The upper carriage block section 50b is provided with a horizontal bore 50c which is oversized with respect to the diameter of drive screw 28. The bore 50c receives the screw 28 and moves relative to it as the carriage block 50 translates when driven by the rotating screw. As noted previously, the legs of the upper carriage section 50b are provided with the horizontally disposed bores 26 and 27 which slidingly receive the carriage guide rod 23. As the drive screw 28 rotates to reciprocate the carriage plate 50, the plate guides along the guide rod 23 to restrain the reciprocating path of the carriage such that a card clamped in the carriage moves along path 22 when the carriage reciprocates under the action of screw 28 driven by motor 30.

The magnetic stripe 16a on the card 16 is located such that when the card is clamped in the carriage 20 with its longitudinal edges engaged by shoulders 57 and 58, the stripe is aligned with a recording surface 24b of a transducer 24a of transducer assembly 24. When the card is translated along path 22 by the screw-driven carriage 20, the stripe 16a passes in transducing relationship with respect to the transducer surface 24b.

Figure 8:
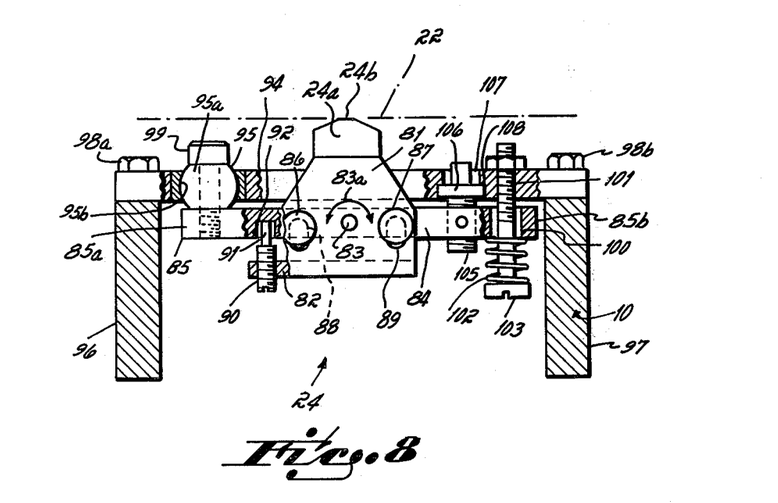
FIG. 8 is an enlarged side elevational view, partially in cross-section, of the transducer and transducer mounting assembly shown in FIG. 2.

The transducer 24a is rigidly secured to a vertically disposed bracket 81. Extending inwardly from the lower edge of the bracket 81 is a horizontal flange 82. The bracket 81 is pivotal about a horizontally disposed pin 83 anchored in the vertical side wall 84 of an elongated bar 85. The pin 83, which is disposed perpendicularly to the frame side wall 12, passes through a suitable bore in the bracket 81. A pair of locking screws 86 and 87 threaded in the side wall 84 of bar 85 pass through oversized holes 88 and 89 in the bracket 81. The oversized holes 88 and 89 permit the bracket 81 and hence the transducer 24a to assume, over a limited range, different angular positions about the pivot pin 83, indicated by arrow 83a (FIG. 8). When the transducer-mounting bracket 81 is pivoted at the desired angle with respect to the pivot pin axis 83, the screws 86 and 87 are tightened to lock the bracket, and hence the transducer 24a, in the desired angular position with respect to the axis of the pivot pin 83.

To facilitate accurate adjustment of the bracket 81 about the axis of the pivot pin 83, a screw 90 which threadably engages the bracket flange 82 is provided. The screw 90, which passes through a threaded hole in the flange 82, is provided at its upper end with an unthreaded reduced-diameter pin 91 which seats in an unthreaded blind hole 92 formed in the lower surface of bar 85. When the screw 90 is threaded into or out of the flange 82 it pivots the bracket 81 about the pin 83. Once the proper pivotal position of the bracket 81 has been achieved by manipulation of the screw 90, the lock screws 86 and 87 are tightened.

The bar 85, to which the bracket 81 carrying transducer 24a is adjustably angularly secured, is mounted at its forward end 85a to the foward end of a stationary horizontal support plate 94 by a ball and socket joint 95. The support plate 94 is secured at its opposite ends by fasteners 98A and 98B to vertically disposed supports 96 and 97 which extend inwardly from and are secured to the interior surface of the side wall 12 of the frame 10. The ball and socket joint 95 includes a ball 95a secured to the end 85a of transducer-supporting bar 85 via a threaded fastener 99. The joint 95 also includes a socket 95b formed in the support plate 94. The ball and socket joint 95 permits the transducer 24a to pivot about a horizontal axis parallel to drive screw 28 passing through the ball and socket joint. The pivotal movement of the transducer 24a permitted by the ball and socket joint 95, indicated in FIG. 4 by arrow 110, allows the transducing surface of the transducer 24a to accommodate angular departures of the record stripe 16a from a horizontal plane which may occur as the card clamped in the carriage 20 reciprocates along path 22.

To accommodate vertical movement of the record stripe 16a of a card clamped in the carriage as it moves along path 22, the bar 85 which mounts the transducer 24a, is designed to pivot about a horizontal axis perpendicular to frame side walls 11 and 12 passing through the joint 95. Such pivotal movement is facilitated by providing the rear end 85b of bar 85 with an oversized hole 100 through which passes a vertically disposed fastener 101 anchored to the plate 94. A compression spring 102 surrounding the fastener 101 between the fastener head 103 and the lower surface of the bar end 85b biases the bar end in an upward direction, while permitting downward movement of the bar end. Upward movement of the bar end 85b is limited by an adjusting screw 105 which is threaded in the bar end. Adjusting screw 105 has an enlarged head 106 which seats in a stepped diameter hole 107. The shoulder 108 of the stepped diameter hole 107 limits the upward travel of the head 106 of the screw 105 and hence of the bar 85 and the associated transducer 24a secured thereto by bracket 81. Screw 105 and shoulder 108 also limit lateral motion of bar 85. Downward movement of the bar end 85b and of the associated transducer 24a is limited by the head 103 and the vertical height of the compressed spring 102. Thus, the joint 95 and the oversized nature of the hole 100 through which the screw 101 passes permits motion of the transducer 24a in the direction of arrow 111 (FIG. 4) to compensate for unevenness of the card as it moves along path 22 when carried by the translating carriage 20.

The slotted disc 6 mounted for rotation with the carriage drive screw 28 and the stationary phototransducing assembly 7 provide timing signals at a rate correlated to the angular velocity of the screw and in turn the translational reciprocation velocity of a card 16 clamped in the carriage 20 moving along the path 22. The timing pulses establish time slots, or windows, for reading and/or writing data bits onto the record stripe 16a of a card 16 moving along path 22 at a bit rate correlated to the translational velocity of the card. As a consequence, data bits are read from the card stripe 16a and/or are written onto the card stripe 16a at a density (in bits per unit length) which is constant notwithstanding variations in the translational velocity of the card stripe 16a along the path 22 induced by variations in angular speed of the motor 30 which drives the screw 28 and translates the carriage 20 to which the card 16 is clamped.

The slotted disc 6 is preferably provided with inner and outer annular rings of slots 6a and 6b and associated slot-sensing phototransducers 7a and 7b located at different radii corresponding to the radii of the rings of slots 6a and 6b. By providing differing numbers of slots per radian, the slotted rings/transducer combinations 6a/7a and 6b/7b will provide timing pulses at different rates to facilitate constant, but different, recording densities per unit length of record stripe. By selection of the appropriate slot ring/phototransducer combination a suitable signal processing circuit connected to the phototransducer assembly 7 and magnetic transducer 24a can read and/or write information on the card stripe 16a at one or the other of two different, but constant, bit densities notwithstanding variations in drive speed of the carriage.

The card capture assembly 36, which strips a card from the carriage 20 as the carriage moves from the position shown in FIG. 2 to its rearward (rightward as viewed in FIG. 2) position for deposit in the captured-card bin 38, includes an arm 36a secured to the pivotal armature 36b of a rotary solenoid 36c mounted to the frame 10. The arm 36a has at its upper end the card abutment 37. The arm 36a is normally positioned in the solid line position shown in FIG. 2 when the solenoid 36c is de-energized. With the arm 36a so positioned, the card abutment 37 is below the path 22 of a card 16 clamped in the translating carriage 20. Upon energization of the solenoid 36c by a suitable control signal, the arm 36a pivots in a clockwise direction, as viewed in FIG. 2, elevating the abutment 37 into the path 22 of a card 16 clamped in the carriage 20. With the abutment 37 so interposed in the path 22, when the carriage 20 moves rightwardly, as viewed in FIG. 2, the leading edge of the clamped card engages abutment 37 and is progressively stripped, or slid, from the carriage block 50. When the left end of the carriage block 50 passes rightwardly of the elevated abutment 37, the card drops into the underlying captured-card bin 38. To insure that the abutment 37 elevates sufficiently above path 22 to effect stripping of a card from carriage block 50, an elongated slot 65a overlying the abutment and disposed parallel to path 22, is provided in the undersurface of plate section 50b along its entire length to receive the uppermost extremity of the elevated abutment.

To control the operation of the pick-up roll assembly 17 and the carriage translating motor 30, a plurality of phototransducer assemblies 115, 116, 117, 118, 119, 120 and 121 are provided.

Figure 7:
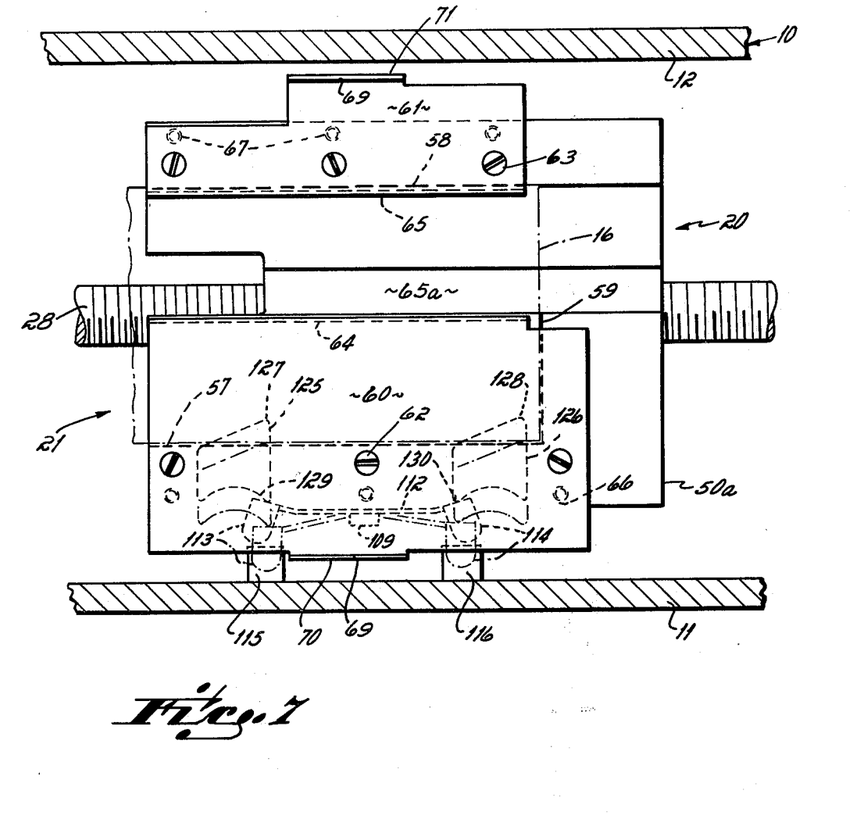
FIG. 7 is a bottom plan view of the card carriage of this invention.

Phototransducer assemblies 115 and 116 each include a light source and photosensor which cooperate with horizontally shiftable flags 113 and 114. Flags 113 and 114 are secured to opposite ends of a horiztonally disposed leaf spring 112 mounted at its center by a fastener 109 to the lefthand vertical side wall of the carriage plate 50. The leaf spring 112 normally biases the flags 113 and 114 to an inner position in which the beams of the light sources of the phototransducer assemblies 115 and 116 are not interrupted. However, upon insertion of a card 16 into the carriage, flags 113 and 114 are successively biased outwardly. Specifically, as the card is inserted, the edge of the card sliding along carriage shoulder 57 successively cams outwardly pistons 125 and 126 which slide in horizontal bores disposed perpendicularly to frame wall 11 provided in the side of the carriage block 50. The pistons 125 and 126 at their inner ends each include a cam edge 127 and 128 angulated inwardly and rearwardly (upwardly and rightwardly as viewed in FIG. 7), which engage the edge of an inserted card sliding on shoulder 57 as it is inserted into the carriage block 50. The pistons 125 and 126 at their outer ends include semi-circular surfaces 129 and 130 which contact the inner ends of the flags 113 and 114.

The phototransducer assembly 121 located proximate the card insertion slot 15 includes a photosensor and a light source with the light beam thereof being directed across the slot 15. Upon insertion of a card into the slot 15 the light beam is broken and the phototransducer assembly 121 is activated. Activation of the phototransducer 121 energizes the motor 43 to initiate movement of the pick-up roll assembly 17 to in-feed the inserted card. When the leading edge of the card is between the pick-up roll 17a and 17b, the card is positively fed into the carriage block 50. As the card moves into the carriage block 50 phototransducer assemblies 115 and 116 are successively activated. When phototransducer assemblies 115 and 116 are both activated, the card is fully inserted into the carriage with its leading end abutting carriage block shoulder 59. At this point a signal is provided by suitable control circuitry to the motor 30 to advance the carriage away from the home position at its left or forwardmost limit of travel as viewed in FIGS. 1 and 2. After the carriage moves rightwardly a predetermined distance from its home position, the phototransducer assembly 117 becomes de-activated. Phototransducer assembly 117 had previously been activated when the carriage was in its home position by virtue of the interposition in the light beam of the phototransducer assembly of a flag 124 mounted on the carriage 20. As noted, the carriage 20 moves rightwardly from the home position a predetermined amount before the phototransducer assembly 117 is de-activated. During this interval of carriage movement from the home position before the phototransducer assembly 117 is de-activated, the motor 43 remains energized continuing to drive the pick-up roll assembly 17 in the in-feed direction to urge and maintain the forward edge of the inserted card 16 against the carriage stop 59. This insures, as the carriage moves away from the home position, that during the transition period when the clamp is moving from the inactive position (phantom lines) to the active position (solid lines), the inserted card 16 remains properly located with its forward edge against the shoulder 59. When the carriage has moved from the home position sufficiently to disengage cam followers 70 and 71 from stationary cam 72 and 73 to insure proper clamping of the card, the phototransducer assembly 117 is de-activated by removal of the flag 124 from interposition in the light beam thereof, causing a signal to be generated for de-energizing the pick-up roll motor 43.

Continued energization of the drive motor 30 causes the carriage to advance toward its rear or rightward position as viewed in FIGS. 1 and 2. As the carriage advances, the carriage-mounted flag 124 successively passes transducer assemblies 118, 119 and 120. Passage of the flag past transducer assembly 118 is not effective during movement of the carriage toward its rear position (rightwardly in FIGS. 1 and 2) to provide a control function. However, when the flag 124 interrupts the beam of the phototransducer assembly 119, a signal is generated to initiate the reading and/or writing function. When the flag 124 interrupts the light beam of the phototransducer assembly 120 while moving toward its rear position, a signal is created to terminate the reading and/or writing operation and reverse the motor 30 such that the carriage reciprocates toward its forwardly and leftwardly position as viewed in FIG. 1. When the carriage advances in a forwardly direction to a point such that phototransducer assembly 118 is activated by the carriage-mounted flag 124, a signal is created which can function to reverse the direction of the motor 30 and advance the carrier toward its rear or rightward position as viewed in FIG. 1 to re-read the card, re-write the card, and/or capture the card.

If it is desired to capture the card the solenoid 36c is energized to elevate the card abutment 37 to its upper position interposed in the path 22. As the carriage 50 then translates toward its rear position (rightwardly as viewed in FIGS. 1 and 2), the card 16 clamped therein is stripped therefrom and is dropped into the underlying bin 38. When the carriage 50 is moved toward its home position and activates the phototransducer 118, if re-writing, re-reading or capturing of the card is not desired, the signal created by phototransducer 118 will be ineffective to reverse the direction of the motor 30 and the motor will remain energized driving the carriage toward its home position. Upon reaching the home position, the flag 124 intercepts the light beam of the phototransducers 117 indicating that the carriage has reached the home position. At this point the motor 30 stops and the motor 43 is energized to out-feed the card whose outboard end has now been inserted into the nip of the pick-up rolls 17a and 17b. The card is now positively driven out of the apparatus via the slot 15. Outward movement of the card from the carriage into the slot 115 successively de-activates phototransducers 116 and 115. Upon de-activation of last to be de-activated phototransducer 115, a signal is generated to terminate energization of the pick-up roll drive motor 43 and the card stops, partially protruding from the slot 15 awaiting manual removal thereof by the user.

If desired, the card apparatus of this invention can capture a card if, after being returned through the slot 15 for manual removal, the customer does not within a predetermined time, e.g., five seconds, remove the card. Sometimes a customer forgets to remove his card after completion of a transaction with the automatic banking equipment in which the card reader is installed. In such cases rather than leave the card in the slot 15 for the next customer to remove and possibly abuse, it is preferable to retract the card back into the card reader and capture it. Such a capability can be provided by utilizing the phototranducer assembly 121 to sense the continued presence of a card returned to the slot 15. When a suitably provided timer times out and the card still remains in the slot 15 the solenoid 36c is energized to elevate the card stop 37 to its phantom line position; in addition, the motors 43 and 30 are energized to feed the card into the carriage and advance the carriage rearwardly to strip the card therefrom into the underlying hopper 38.

Having described the invention, what is claimed is:

1. A read/write device for a card having a magnetic record stripe thereon, comprising:
    a relatively stationary magnetic transducer,
    a card carriage for supporting said card for movement in a path past said transducer to read/write information on said record stripe,
    a carriage guide mounting said card carriage for movement between first and second travel limits between which said path is located,
    a card clamp mounted for movement with said card carriage, said clamp including:
    (a) a card-engaging member pivotally mounted to said carriage for pivotal movement about an axis generally parallel to said path, said member being pivotally movable between active and inactive positions to clamp and unclamp a card in said carriage, said member including a cam follower,
    (b) bias means acting between said card-engaging member and said card carriage to normally bias said member to its active position into clamping engagement with said card to limit relative movement between said card and carriage and flatten said card when said card carriage is displaced from said first travel limit, and
    (c) a clamp deactuator operatively engageable with said member to pivotally move said member about said axis to its inactive position when said card carriage is in its first travel limit to facilitate card insertion and removal, said deactuator including a stationary cam mounted to engage said cam follower and pivot said member to its inactive position to disengage said card and member when said carriage is at its first travel limit, said bias means pivoting said card-engaging member to its active position to engage said card when said carriage is displaced from its first travel limit and said cam and cam follower are disengaged, and
    drive means connected to said card carriage to drive said carriage along said guide between said travel limits.

2. The read/write device of claim 1 further including a transducer mount assembly comprising:
    (a) a plate on which said transducer is mounted,
    (b) a stationary frame,
    (c) a ball and socket joint interconnecting said plate and frame on one side of said transducer to facilitate limited pivotal movement of said transducer about an axis parallel to said path, and (d) a resilient interconnection between said plate and frame on the other side of said transducer to facilitate limited bidirectional motion of said transducer toward and away from the record stripe of a card clamped in said carriage as it moves along said path.

3. The device of claim 1 further including a card stripper mounted for movement between a card stripping position interposed in the path of a clamped card moving with said card carriage and a nonstripping position spaced from said clamped card path, a stripper actuator connected to said stripper to move said stripper to its stripping position, when said carriage is driven by said drive means between its travel limits and said clamp deactuator is disengaged, to strip a clamped card from said carriage as said carriage is driven past said stripper, a card clamped in said carriage engaging said interposed stripper and being slid from said carriage by continued movement of said carriage past said stripper.

4. The device of claim 1 wherein said drive means includes a nut mounted to said carriage and a bidirectionally rotatable screw engaged with said nut to reciprocate said carriage along said path when said screw is alternatively rotated in opposite directions, said device further including a vibration absorbing mass resiliently mounted to said carriage for movement in a direction normal to said path to absorb vibration-induced displacement between said transducer and the record stripe of a card clamped in said carriage as it is driven along said path.

5. The device of claim 1 wherein said carriage includes card-locating surfaces disposed parallel to said path for engaging and locating opposite edges of a card supported by said carriage, said carriage further including a stop member positioned to engage and locate the inner edge of a card supported on said carriage, said device further including (a) a rotatable friction card-engaging drive element mounted for rotation about a stationary axis to engage a card supported on said carriage when said carriage is proximate its first travel limit and said card clamp is in its inactive position, (b) means for rotating said friction card-engaging drive element, when said carriage is moving away from its first travel limit and said clamp is moving from its inactive position to its active position, to urge said card inner edge against said card stop during the transition period when said card carriage is moving from its first travel limit and said card clamp is not yet in its active position clamping said card to said carriage.

6. The device of claim 1 wherein said drive means includes a nut mounted to said carriage and a bidirectionally rotatable screw engaged with said nut to reciprocate said carriage along said path when said screw is alternatively rotated in opposite directions, said device further including (a) a timing disc mounted only for rotational movement in synchronism with said screw, said timing disc including sensible timing indicia thereon, (b) a stationary sensor mounted in sensing relationship to said disc indicia for providing timing signals at a rate correlated to the angular velocity of said timing disc and in turn the rectilinear reciprocation velocity of said card along said path, and (c) an information processing circuit connected to said sensor and transducer for reading and/or writing information on said record stripe at a rate correlated to said timing signal rate and in turn said rectilinear reciprocation rate of said card along said path.

7. A read/write device for a card having an elongated magnetic record stripe thereon for recording information bits at a predetermined constant density along the length of said record stripe, said device comprising:

a relatively stationary magnetic transducer, a card carriage for supporting said card for movement in a path past said transducer to read/write information bits on said record stripe at said predetermined constant density, an elongated carriage guide disposed parallel to said path, said guide mounting said card carriage for guiding said carriage for movement between first and second limits of travel between which said path is located, said carriage including card-locating surfaces disposed parallel to said path for engaging and locating opposite edges of a card supported by said carriage, said carriage further including a stop member positioned to engage and locate the inner edge of a card supported on said carriage, drive means connected to said card carriage to reciprocate said carriage along said guide between said limits of travel, said drive means including a nut mounted to said carriage and a bidirectionally rotatable elongated screw disposed parallel to said guide, said screw being engaged with said nut to reciprocate said carriage along said path when said screw is alternatively rotated in opposite directions, a card clamp mounted for movement with said card carriage, said clamp including (a) a card-engaging member pivotally mounted to said carriage and movable between active and inactive positions to clamp and unclamp a card positioned in said carriage with its edges located by said card-locating surfaces and stop member, said card-engaging member including a cam follower, (b) bias means acting between said card-engaging member and said card carriage to normally bias said card-engaging member to its active position into clamping engagement with said card to limit relative movement between said card and carriage and flatten said card when said card carriage is displaced from said first limit of travel, and (c) a cam mounted to engage said cam follower and pivot said card-engaging member to its inactive position to disengage said card and card-engaging member when said carriage is at its first limit of travel, said bias means pivoting said card-engaging member to its active position to engage said card and card-engaging member when said carriage is displaced from its first limit of travel and said cam and cam follower are disengaged, a rotatable friction card-engaging drive element mounted for rotation about a stationary axis to engage a card supported on said carriage when said carriage is proximate its first limit of travel and said clamp is in its inactive position, means for rotating said friction card-engaging drive element when said carriage is moving away from its first limit of travel and said clamp is moving from its inactive position to its active position to urge said card inner edge against said card stop during the transition period when said card carriage is moving away from its first limit of travel and said card clamp is not yet in its active position clamping said card to said carriage, a card stripper mounted for movement between a card stripping position interposed in the path of a clamped card moving with said card carriage and a nonstripping position spaced from said clamped card path, a stripper actuator connected to said stripper to move said stripper to its stripping position, when said carriage is driven by said drive means between its limits of travel and said cam and cam follower are disengaged, to strip a clamped card from said carriage as said carriage is driven past said stripper, a card clamped in said carriage engaging said interposed stripper and being slid from said carriage by continued movement of said carriage past said stripper, a timing disc mounted only for rotational movement in synchronism with said screw, said timing disc including sensible timing indicia thereon, a stationary sensor mounted in sensing relationship to said disc indicia for providing timing signals at a rate correlated to the angular velocity of said timing disc and in turn the rectilinear reciprocation velocity of said card along said path, and an information processing circuit connected to said sensor and transducer for reading and/or writing information bits on said record stripe at a rate correlated to said timing signal rate and in turn said rectilinear reciprocation rate of said card along said path.

8. The device of claim 7 further including a transducer mount assembly comprising:
(a) a plate on which said transducer is mounted,
(b) a stationary frame,
(c) a ball and socket joint interconnecting said plate and frame on one side of said transducer to facilitate limited pivotal movement of said transducer about an axis parallel to said path, and
(d) a resilient interconnection between said plate and frame on the other side of said transducer to facilitate limited bidirectional motion of said transducer toward and away from the record stripe of a card clamped in said carriage as it moves along said path.

* * * * *